UNITED STATES PATENT OFFICE.

OLAF JENSEN, OF NOTODDEN, NORWAY, ASSIGNOR TO NORSK HYDRO-ELEKTRISK KVAELSTOFAKTIESELSKAB, OF CHRISTIANIA, NORWAY.

HANDLING OF NITROXYL SULFURIC ACID.

1,319,586.  Specification of Letters Patent.  Patented Oct. 21, 1919.

No Drawing. Application filed June 11, 1919. Serial No. 303,438.

*To all whom it may concern:*

Be it known that I, OLAF JENSEN, a subject of the King of Norway, residing at Notodden, Norway, have invented certain new and useful Improvements in the Handling of Nitroxyl Sulfuric Acid; and I do hereby declare the following to be a full, clear, and exact description of the invention, such as will enable others skilled in the art to which it appertains to make and use the same.

This invention relates to the treatment and handling of nitroxyl sulfuric acid and has for its object a method by means of which the destructive action of the acid upon the apparatuses and devices of iron with which the acid gets into contact, is prevented.

When nitrous gases are absorbed in sulfuric acid such as for instance in the Gay-Lussac tower of sulfuric acid factories or in the utilization of nitrogen oxids obtained by the oxidation of nitrogen, nitroxyl sulfuric acid is formed. This nitroxyl sulfuric acid attacks iron and for this reason it cannot be treated, stored or conveyed in apparatuses of iron. Even when the substantial part of the nitrogen is expelled as nitrous gases by boiling the small quantities still contained in the acid will frequently still be sufficient to render it impossible to construct the pumps, pipes, absorption towers, transport- and storage barrels and other apparatuses and devices for its treatment of iron, and expensive and inconvenient apparatuses and devices of stoneware have therefore to be used.

The present invention is based upon the discovery that nitroxyl sulfuric acid to which a small quantity of nitric acid has been added does not attack the iron and in accordance with this discovery the present method consists in adding to the nitroxyl sulfuric acid to be handled in contact with iron a small quantity of nitric acid. An addition of less than 1 per cent. of nitric acid will suffice to attain the desired effect and usually only from 0.1 to 0.5 per cent. will be used. The method has its greatest importance in the treatment of sulfuric acid, from which the greatest part of the nitroxygen has been boiled out in which case the acid is nearly free from nitric acid.

I claim:

1. In the handling of nitroxyl sulfuric acid a method of eliminating the destructive effect of the acid upon iron which consists in adding to the acid a small quantity of nitric acid.

2. In the handling of nitroxyl sulfuric acid a method of eliminating the destructive effect of the acid upon iron which consists in adding to the acid a quantity of nitric acid less than one per cent.

In testimony that I claim the foregoing as my invention, I have signed my name in presence of two subscribing witnesses.

OLAF JENSEN.

Witnesses:
 OLGA MÜLLER,
 MOGNES BUGGE.